United States Patent [19]

Headley

[11] 4,152,953

[45] May 8, 1979

[54] ROLLER CAM FOLLOWER WITH ANTI-ROTATION DEVICE

[75] Inventor: David B. Headley, Eaton Rapids, Mich.

[73] Assignee: General Motors Corporation, Detroit, Mich.

[21] Appl. No.: 860,955

[22] Filed: Dec. 15, 1977

[51] Int. Cl.² .................. F16H 53/06; F01L 1/06
[52] U.S. Cl. ........................... 74/569; 74/55; 123/90.48; 123/90.5; 123/90.6
[58] Field of Search .............. 123/90.21, 90.48, 90.5, 123/90.6; 74/55, 569

[56] References Cited

U.S. PATENT DOCUMENTS

| | | | |
|---|---|---|---|
| 1,084,514 | 1/1914 | Whitlock | 123/90.26 |
| 1,165,135 | 12/1915 | Seitz | 123/90.48 |
| 1,177,428 | 3/1916 | Melin | 123/90.48 |
| 1,886,930 | 11/1932 | Alder | 74/569 |
| 1,930,261 | 10/1933 | Berry | 123/90.5 |
| 2,010,167 | 8/1935 | Tibbetts | 123/90.6 |
| 2,036,936 | 4/1936 | Halford | 123/90.46 |
| 2,223,759 | 12/1940 | Dillstrom | 74/569 |
| 3,277,874 | 10/1966 | Wagner | 74/569 |
| 3,523,459 | 8/1970 | Mowbray | 123/90.48 |

FOREIGN PATENT DOCUMENTS 614018 9/1926 France ..................... 123/90.48

OTHER PUBLICATIONS

"Reid Automatic Valve Clearance Adjuster" Nov. 15, 1930, Automotive Industries, p. 716.

Primary Examiner—Charles J. Myhre
Assistant Examiner—Jeffrey L. Yates
Attorney, Agent, or Firm—Arthur N. Krein

[57] ABSTRACT

A roller type cam follower carries a floating guide plate having an end thereof extending below the roller to be slidably received in a slotted groove provided in the cam on which the roller rides whereby to prevent rotation of the cam follower.

2 Claims, 4 Drawing Figures

ROLLER CAM FOLLOWER WITH ANTI-ROTATION DEVICE

This invention relates to internal combustion engines and, in particular, to a cam and follower structure for use in operating valves, unit fuel injection devices and similar elements in such engines or in other type mechanisms.

FIELD OF THE INVENTION

Cam follower anti-rotation devices are normally used with roller type cam followers to prevent the roller of such a follower from skewing relative to the surface of the cam engaged by the roller. However, the known prior art anti-rotation devices have either been complex in their construction, somewhat inefficient in operation, or have required the use of such cam followers in pairs to prevent their rotation.

SUMMARY OF THE INVENTION

The present invention relates to an anti-rotation device for a roller type cam follower and cam mechanism wherein the anti-rotation device is in the form of a guide plate having a through aperture adjacent one end thereof so as to loosely receive the roller of the follower therethrough whereby the guide plate is supported by the roller with its opposite end projecting below the roller to be slidably received in a slotted annular groove provided in the cam.

The primary object of this invention is to provide an improved roller type cam follower and cam mechanism whereby the roller of the follower is prevented from skewing relative to the cam.

Another object of this invention is to provide a roller cam follower and cam mechanism with an anti-rotation device whereby to prevent rotation of the cam follower relative to the cam.

A still further object of this invention is to provide a roller cam follower and cam mechanism with an anti-rotation device that is simple in construction and of low cost.

For a better understanding of the invention, as well as other objects and further features thereof, reference is had to the following detailed description of the invention to be read in connection with the accompanying drawings.

DESCRIPTION OF THE PREFERRED EMBODIMENT

Figure 1:
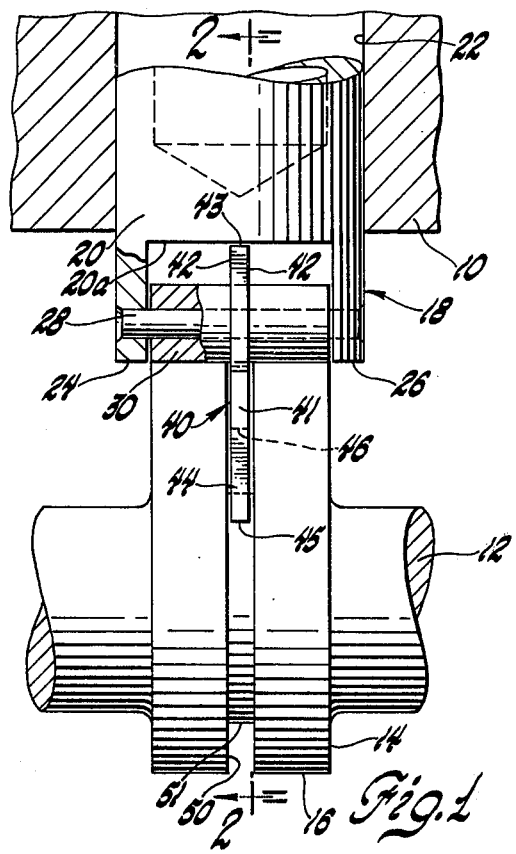
FIG. 1 is an elevational view of a portion of an internal combustion engine having a preferred embodiment of a cam follower and cam mechanism with an anti-rotation device in accordance with invention associated therewith, with parts of the cam follower broken away to show the details of its structure.
Figure 2:
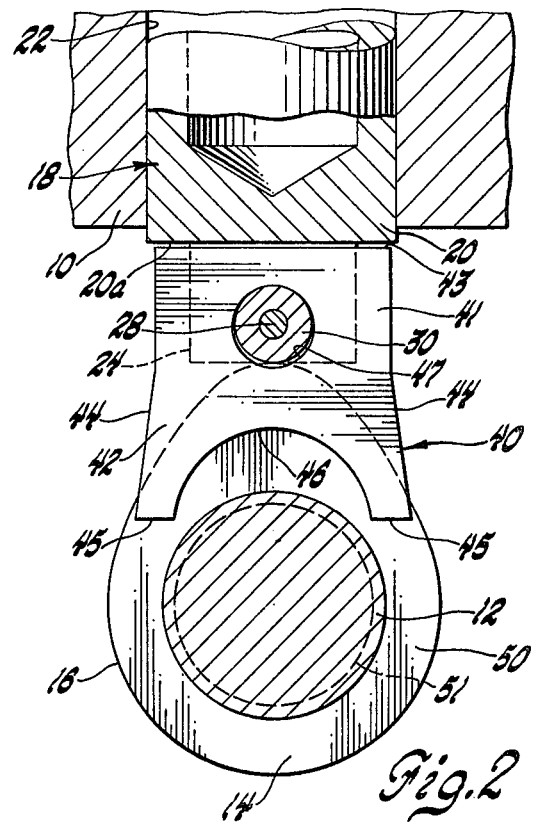
FIG. 2 is a sectional view of the cam follower and cam mechanism of FIG. 1 taken along line 2—2 of FIG. 1.

Referring to FIGS. 1 and 2, reference numeral 10 indicates the cylinder block, for example, of an internal combustion engine having a camshaft 12 journaled therein in a conventional manner. Camshaft 12 has a cam 14 thereon having a follower lifting cam surface 16 used to effect reciprocable movement of a valve, unit fuel injector or similar element associated with the engine through a roller type cam follower mechanism 18.

The roller cam follower mechanism 18 includes a cup-saped follower 20 which is slidably received in the bore 22 in the cylinder block 10 for reciprocating movement therein. The lower end of the follower 20 terminates in a pair of spaced apart arms 24 and 26 depending from the flat lower end 20a of the follower, these arms supporting the opposite ends of a roller support shaft 28 in suitable apertures provided for this purpose in these arms. A cam follower roller 30 is suitably, rotatably carried by the sahft 28 and is guided endwise thereof by the inner faces of the arms 24 and 26. As is well known, in such a structural arrangement, suitable bias means, not shown, would be provided to act against the follower 20 whereby to continuously bias the can follower roller 30 in a direction, down with reference to the drawings, to be in rolling contact with the cam surface 16 of cam 14.

Referring now to the subject matter of the invention, the anti-rotation feature of the roller cam follower mechanism 18, in accordance with the invention, is provided by means of a guide plate, generally designated 40, which is supported by the cam follower roller 30, in a manner to be described, and by means of an annular recessed or slotted groove provided in the surface 16 of cam 14.

Guide plate 40, in the preferred embodiment shown in FIGS. 1 and 2, is in the form of a flat plate 41 of a predetermined thickness and having parallel, opposed sides 42, a straight top or upper edge 43, spaced apart side edges 44, each of which is flared outward at its lower end or end opposite upper edge 43 to terminate at a lower edge 45 having an arcuate central cut-out portion or notch therein 46 that corresponds in configuration to a semi-circular cut-out of predetermined diameter.

Intermediate its upper edge 43 and lower edge 45, the plate 41 is provided with a substantially, centered, circular bore to provide an annular internal wall or bore surface 47 that is of a predetermined internal diameter slightly larger than the outside diameter of cam follower roller 30, so that the cam follower roller 30 can be loosely and rotatively received in this bore. The arrangement is such that with the guide plate 40 assembled to the cam follower roller 30, as shown, with this roller 30 extending loosely through the bore in the guide plate, the guide plate 40 will be loosely supported and journaled by the cam follower roller 30.

Also, as shown, the bore providing the bore surface 47 is located a predetermined distance from the upper edge 43 of the guide plate so that when the guide plate rests on the upper peripheral surface of the cam follower roller 30, as shown, the upper edge 43 is out of engagement with the lower end 20a of follower 30. However, it will be apparent that depending on the rotation of the cam follower roller 30, any rotation imparted to the guide plate 40 by this roller engaging the bore surface 47 thereof can only effect limited rotative movement of the guide plate as limited by a corner of the upper edge 43 of the guide plate coming into engagement with the lower end 20a of the follower 20. Guide plate 40 is thus restrained from rocking about the cam follower roller 30.

Referring now to the slotted groove 50 in the surface 16 of cam 14, this groove is preferably formed in the center of the cam 14, with its center thus preferably aligned with the axis of the follower 20 in bore 22 of the cylinder block 10, and this slotted groove 50 which is of a predetermined width slightly wider than the thickness of guide plate 40 is defined by a lower annular groove base 51 that is formed concentric with the cam shaft 12. Groove base 51 preferably has an outside diameter sightly larger than the outside diameter of camshaft 12 and the diameter of the arcuate slot 46 of the guide plate 40 corresponds to this diameter of the groove base 51, as desired.

As will readily be apparent with reference to FIG. 2, the depth of the slotted groove 50 is nonuniform relative to the rise and fall on the cam surface 16 of cam 14, but it is of sufficient depth so that in all rotative positions of the cam 14, the lower end portion of the guide plate will be loosely received therein to be guided thereby, whereby to prevent rotation or skewing of this guide plate 40 relative to the axis of the cam shaft. The cam follower roller 30 is thereby also prevented from skewing relative to the surface of the cam 14 and thus prevents rotation of the follower 20 within the bore 22.

Figure 3:
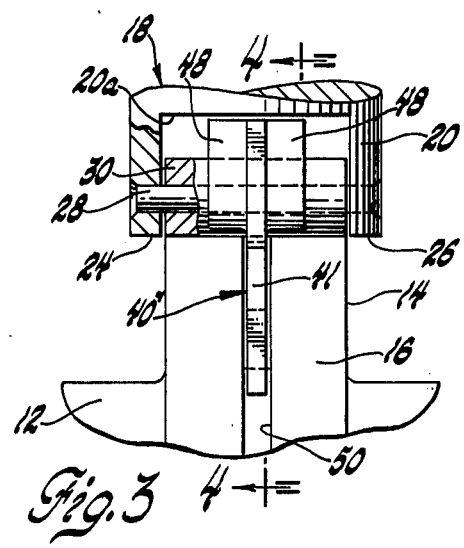
FIG. 3 is an elevational view, with parts broken away, of an alternate embodiment of a cam follower and cam mechanism with anti-rotation device in accordance with the invention.
Figure 4:
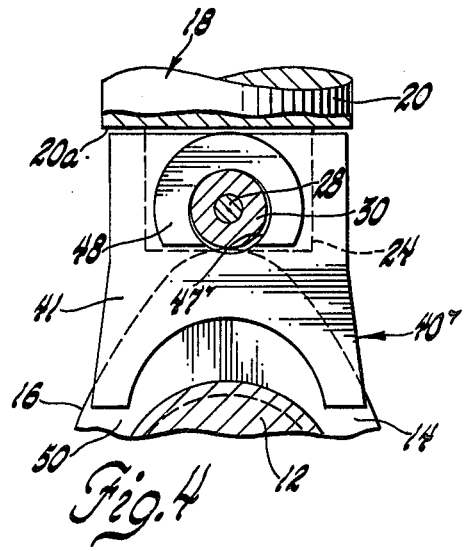
FIG. 4 is a sectional view of the cam follower and cam mechanism of FIG. 3 taken along line 4—4 of FIG. 3.

Referring now to the alternate embodiment of the roller cam follower with anti-rotation device shown in FIG. 3 and 4, wherein like parts are designated by similar reference numerals, in this alternate embodiment, the guide plate 40' includes the plate 41 which is provided with side extension bosses 48 adjacent to the upper end thereof through which the bore providing the bearing or bore surface 47' extends. As shown, each of these bosses 48, extending from opposite sides of the guide plate, is of semi-circular configuration, that is, each is in the form of a truncated circular cylinder, so that these bosses do not completely encircle the cam follower roller 30, whereby a predetermined portion of this cam follower roller is thus exposed relative to these bosses 48 to engage the follower cam surface 16 on the cam 14. Stated in otherwards, the bore providing the bore surface 47' breaks out of the lower end of these bosses 48. It will be apparent to those skilled in the art that the bosses 48 can be formed integral with the plate 41 or can be formed as separate boss elements secured as by welding to the plate 41.

By providing these bosses 48 on opposite sides of the plate 41 the bearing surface of this guide plate 40' which can be engaged by the cam follower roller 30 is increased whereby to reduce the possible galling of the surface of the cam follower roller 30 by the bore surface 47' of the guide plate n certain applications.

With either of the embodiments disclosed, the guide plates 40 and 40' are each free to float lengthwise on the cam follower roller 30 to allow for cam 14 expansion, for example.

Although not shown, it will be apparent to those skilled in the art, that the guide plate 40', for example could be supported on the roller shaft 28 in lieu of on the cam follower roller and, in such an arrangement the cam follower roller 30 would be a split roller, that is, a two piece roller with roller pieces journaled by the roller shaft 28 on opposite sides of the guide plate 40'.

In any of the embodiments, it will now be apparent that, preferably, the guide plate should be of a length so as to be carried by the cam follower mechanism and should not ride on the base 51 of the slotted groove 50 or on the camshaft 12 but only be guided by the internal sides of the cam 14 provided by the slotted groove 50 therein.

The embodiments of the invention in which an exclusive property or privilege is claimed are defined as follows:

1. A cam and cam follower mechanism including a rotary cam having a follower lifting cam surface with an annular slotted groove in the outer periphery thereof, a reciprocably guided follower having one end thereof bifurcated to provide spaced apart arms extending from a lower end surface thereof, a cam follower roller means rotatably supported by said follower with said roller means positioned between said legs for rolling engagement with said cam surface, and an anti-rotation plate means having an arcuate notch at one end of a radius corresponding to the radius of said annular groove, at its opposite end a surface conforming in shape to said lower end surface, and a through aperture bearing portion intermediate its ends of a diameter so as to slidably encircle said cam follower roller means whereby said anti-rotation plate means is supported by said cam follower roller means in position to having said one end with said arcuate notch of said anti-rotation plate means slidably received in said annular groove whereby to prevent rotation of said follower.

2. A cam and cam follower mechanism including a rotary camshaft with a cam having a follower lifting cam surface thereon, said cam surface having an annular slotted groove in the outer periphery thereof, a reciprocably guided follower having a bifurcated end to provide spaced apart arms extending from a lower flat end surface thereof, a roller shaft fixed to said arms a cam follower roller rotatably supported by said roller shaft with said roller positioned between said legs for rolling engagement with said cam surface, and an anti-rotation guide plate means having an arcuate notch at one end of a radius corresponding to the radius of said annular groove, said guide plate means further having at its opposite end a flat surface conforming in shape to said lower end surface, and a through aperture bearing portion intermediate its ends of a diameter slidably receiving said cam follower roller whereby said anti-rotation plate means is supported and journaled by said cam follower roller in position to having said one end thereof with said arcuate notch therein is slidably received in said annular groove to prevent rotation of said follower relative to said cam.

* * * * *